United States Patent [19]

Wood et al.

[11] 4,209,239

[45] Jun. 24, 1980

[54] PLOTTING APPARATUS HAVING AN ADJUSTABLE PLOTTING HEAD

[75] Inventors: Kenneth O. Wood, Ellington; Robert S. Alford, Vernon, both of Conn.

[73] Assignee: The Gerber Scientific Instrument Company, South Windsor, Conn.

[21] Appl. No.: 833,374

[22] Filed: Sep. 14, 1977

[51] Int. Cl.$^2$ .............................................. G03B 41/00
[52] U.S. Cl. ...................................................... 354/4
[58] Field of Search .............. 346/29, 108, 46; 354/4, 354/14; 29/45, 46; 33/21 R

[56] References Cited

U.S. PATENT DOCUMENTS

| | | | |
|---|---|---|---|
| 1,443,965 | 2/1923 | Parsons | 29/48.5 R |
| 2,976,103 | 3/1961 | Flanders et al. | 346/29 |
| 3,171,327 | 3/1965 | Williamson | 29/57 X |
| 3,330,182 | 7/1967 | Gerber et al. | 354/77 X |
| 3,984,747 | 10/1976 | Gerber et al. | 318/632 |

Primary Examiner—Michael L. Gellner
Attorney, Agent, or Firm—McCormick, Paulding & Huber

[57] ABSTRACT

A drum plotter having an optical light head which projects a beam of light onto a light sensitive film as the head and film are moved relative to one another includes an aperture plate that is shifted relative to the beam in order to adjust the image produced by the beam on the film. The aperture plate is selectively shifted within the plotting head relative to the beam by means of an abutment pin that is engaged with the aperture plate at a travel limit of the plotting head. Movement of the plotting head toward the abutment after engagement of the pin and plate moves the late within the head and shifts one of a plurality of apertures into registration with the beam axis to change or control the image produced by the beam on the light sensitive film.

31 Claims, 5 Drawing Figures

PLOTTING APPARATUS HAVING AN ADJUSTABLE PLOTTING HEAD

BACKGROUND OF THE INVENTION

The present invention relates to an apparatus for performing a controlled operation on a workpiece and is concerned more particularly with an apparatus having changeable operating characteristics and the means and method by which the operating characteristics are changed.

In prior art plotting apparatuses such as disclosed in U.S. Pat. No. 3,330,182, issued to Gerber et al and having the same assignee as the present application, an optical light head is moved relative to a sheet of light sensitive material and selectively exposes the material in order to produce a plot of graphic information. The selective exposure occurs by projecting a beam of light from the head onto the sheet material to produce a light spot and then moving the sheet material and head relative to one another to move the spot along a predetermined path and expose the sheet material correspondingly. The exposure, when photographically developed, produces a line trace corresponding to the path traversed by the light spot and having a width corresponding to the width of the spot. Line traces can also be produced by flashing the light spot at consecutive positions on the sheet material. Additionally, individual flashes at selected locations on the sheet material expose the light sensitive material in accordance with the shape of the light spot.

In U.S. Pat. No. 3,330,182, referenced above, an aperture plate is provided in the light head with a plurality of individual apertures of different sizes and shapes. The apertures are situated in a circular array and by rotating the plate, individual apertures are brought into registration with the light beam projected onto the light sensitive material. By suitable optical means, the image of the aperture is focused on the materials so that the size and shape of the aperture controls the graphic image produced.

The mechanism which rotates the aperture plate in the referenced patent includes a drive motor engaged by means of suitable gearing with the circular periphery of the aperture plate and an encoder producing feedback signals in response to plate movement. The motor is controlled by an associated device such as the computer which operates the plotter, and the command signals generated by the computer are compared with feedback signals from the encoder in a closed loop system. Since the aperture plate is mounted in the light head for cooperation with the light beam, the drive motor and controls for the aperture plate are also mounted in the head. The motor and controls add to the overall weight and size of the head which increases the head inertia and correspondingly decreases the plotter performance and accuracy. With digitally controlled plotters in particular, it is desirable to have a plotting head which is as light as possible in order to handle a large volume of plotting data rapidly and maximize the plotter throughput.

It is, therefore, a general object of the present invention to provide a controlled apparatus with an improved means for changing the operating characteristics of a tool head. It is a further object of the present invention to provide a plotter having an adjustable plotting instrument in the head and mechanism separated from and engageable with the head for adjusting the instrument.

SUMMARY OF THE INVENTION

The present invention relates to method and apparatus for changing the operating characteristics of a tool head. The tool head comprises an adjustable instrument such as an optical light head in a plotter for generating graphic images on a sheet of plotting material. The apparatus includes drive means for translating the head and a workpiece relative to one another so that the work operation can be carried out at various locations on the workpiece.

Means are provided on the tool head for adjusting or changing the operating characteristics of the instrument and include a member that is movable relative to the head to produce a desired adjustment. For example, where the instrument is a light head that projects a beam of light onto a photo-sensitive sheet of plotting material, the movable member may be an aperture plate that inserts one of a series of apertures into registration with the beam and controls the beam size, shape or other beam parameter.

Actuating means also mounted in the apparatus is separated from the tool head to selectively engage the movable member and adjust the instrument while the head and actuating means move relative to one another. The actuating means may include an abutment which is situated at one of the limits of travel of a movable tool head to establish engagement with the movable members when the head moves toward the limit. If the movable member is an aperture plate in a light head, continued movement of the head toward the abutment after the aperture plate has been engaged shifts the plate relative to the head and changes the apertures in registration with the light beam. A corresponding change in the image produced on the plotting material results.

By removing the actuating means from the tool head, greater performance and accuracy is permitted due to a lighter and smaller head and supporting structure. Furthermore, the drive means which positions the tool head and workpiece relative to one another also serves as the mechanism for adjusting the instrument and eliminates the need for another motor in the head and control system for the adjustment function.

DESCRIPTION OF THE PREFERRED EMBODIMENT

Figure 1:
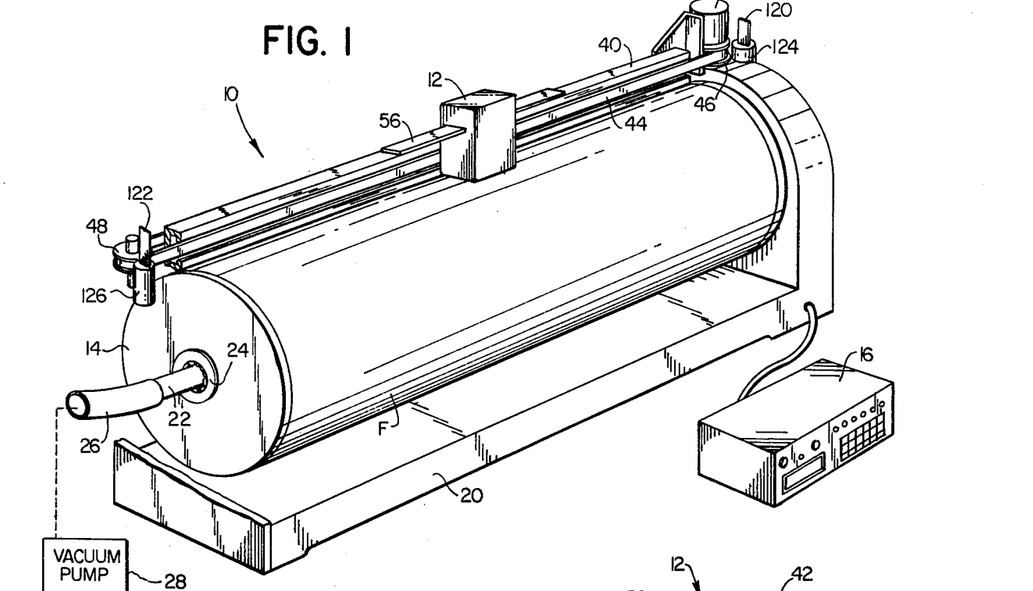
FIG. 1 is a perspective view illustrating a drum plotter in which the present invention is employed.

FIG. 1 illustrates a drum plotter, generally designated 10, incorporating the present invention. The drum plotter is an automatically controlled apparatus which includes a plotting instrument such as the head 12 for generating graphic images on a workpiece such as a sheet of plotting material mounted on a round support bed or drum 14. In the illustrated embodiment of the invention, the plotting head 12 is a photo-optical light head that produces a beam of light and projects the beam downwardly toward the drum 14 and the sheet of plotting material which is a light sensitive film F. In operation, the plotter 10 is positioned in a low light level room and the beam of light from the plotting head 12 is projected onto a spot on the film. The film is secured to the drum 14 in a flat condition, and the head 12 and the film are moved relative to one another so that the spot of light can be translated to various locations over the film. The plotting head can flash the spot of light on and off so that the graphic image on the film is produced singly or repetitively, or the spot may be continuously illuminated as relative motion occurs. A control computer 16 connected with the plotter 10 is operated by a program which determines the manner of excitation of the beam and the relative movement of the plotting head and film to expose the film in a predetermined fashion corresponding to the graphic images desired. For example, the film can be used to produce mechanical drawings, maps, electrical diagrams, printed matter and a multitude of other products.

The plotting drum 14 on which the film is mounted is supported in a frame 20 for rotation about the central axis of the drum. As viewed in FIG. 1, the frame 20 is broken away at the near end to expose a shaft 22 and bearings 24 which mount the drum for rotation on the shaft. The cylindrical surface of the drum may be provided with a plurality of fine apertures distributed over the region on which the film is mounted to hold the film in place on the drum when a vacuum is drawn through the apertures from inside the drum. For this purpose, the shaft 22 extending inside the drum is hollow and is connected at the near end in FIG. 1 which a vacuum hose 26 connected to a vacuum pump 28.

Figure 2:
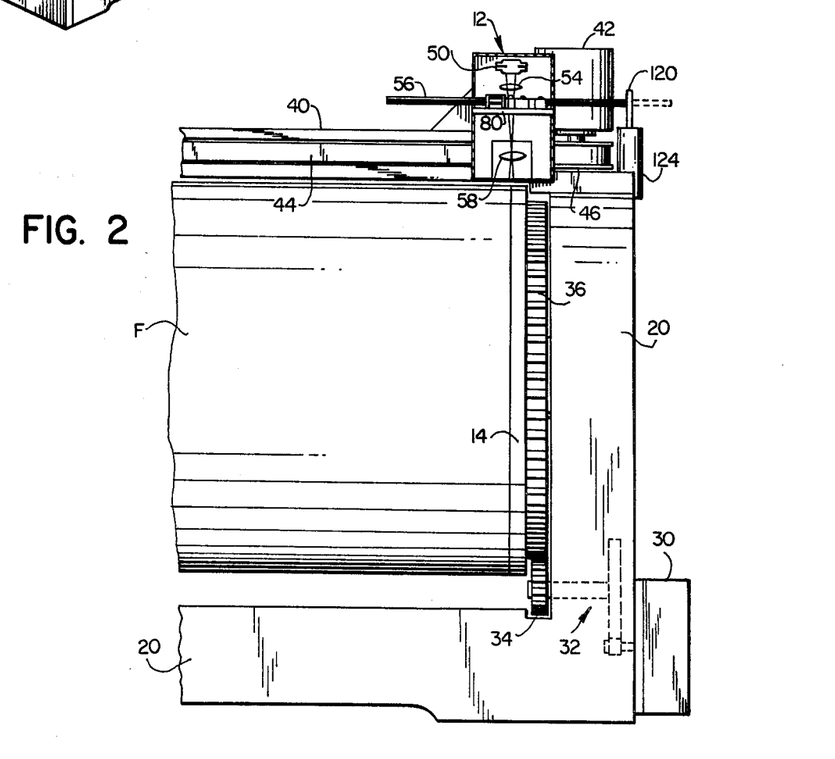
FIG. 2 is a partial front elevation view of the drum plotter at one side and illustrates the optical light head at one limit of travel.

As shown in FIG. 2, the drum 14 is rotatably driven about its central axis by means of a reversible drive motor 30 and a transmission 32 having a pinion gear 34 engaging a large ring gear 36 attached to the one end of the drum. The drive motor 30 receives command signals from the computer 16 in FIG. 1 and rotates the drum and the film F mounted on the cylindrical drum surface relative to the plotting head 12 supported above the drum. While the illustrated drum plotter contemplates plotting on a film no larger than the cylindrical surface of the drum 14, it should be understood that the invention can also be employed in drum plotters having storage rolls at opposite sides of the drum for feeding long strips of plotting material over the drum and under the plotting head 12.

The plotting head 12 is mounted for movement along a support beam or rail 40 connected to the frame 20 above the plotting drum 14. Suitable bearings attached to the head 12 engage the beam so that the head is accurately guided along the beam at a predetermined distance above the cylindrical surface of the drum.

Another reversible drive motor 42 is mounted to the frame 20 at one end of the drum and is connected in driving engagement with the plotting head 12 by means of a toothed drive belt 44 and a drive pulley 46 on the motor shaft. At the opposite end of the support beam the drive belt is mounted on an idler pulley 48. With the plotting head 12 mounted to move back and forth on the support beam 40, command signals are supplied to the drive motor 42 and accurately position the plotting head on the beam at various positions above the drum 14 and light sensitive film F.

It should be understood that by translating the plotting head 12 on the support beam and rotating the drum 14, the drive motors 30 and 42 in response to the computer 16 move the head and film relative to one another to any given point on the film. Thus, the spot of light generated by the head photographically exposes the light sensitive film F with programmed graphic information and the film when developed as a positive or negative produces a visual image of the information. For a more complete description of a drum plotter of this type and controls for the plotter, reference may be had to U.S. Pat. No. 3,984,747.

Figure 4:
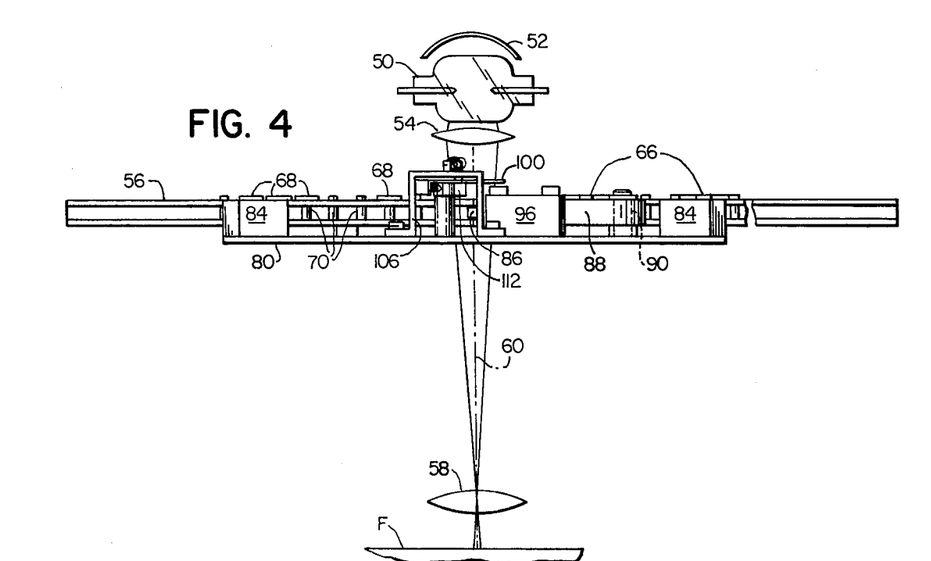
FIG. 4 is a front elevation view of the aperture plate and optical system in the light head.

As shown in FIGS. 2 and 4, the plotting head 12 includes a light source 50 which is typically a mercury-xenon vapor lamp having two spaced electrodes within a glass envelope. Light from the source is directed as a beam toward the cylindrical surface of the drum and the light sensitive film F by means of a reflector 52. The beam passes along a beam axis 60 through an optical system including a condensing lens 54, an aperture plate 56 which may include various filters, lenses or shutters and a projecting or objective lens 58. The condensing lens 54 which may be a compound lens system concentrates the light from the source on one particular area of the aperture plate 56 in a "confused" or unfocussed condition.

Figure 3:
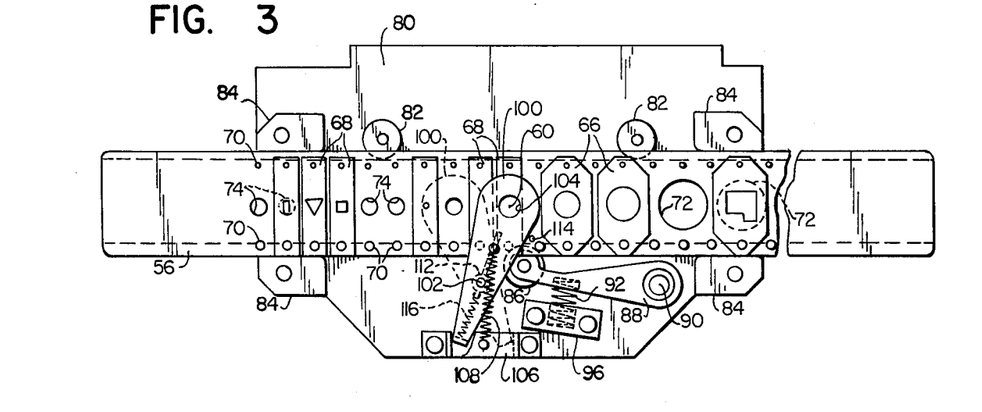
FIG. 3 is a plan view illustrating the aperture plate and its mounting mechanism in the light head.

As shown in FIG. 3, the aperture plate includes a plurality of aperture masks distributed serially in a linear array along the plate. One ground of masks 66 defines beam apertures which are larger than the apertures in the other group of masks 68, and the two groups are separated with the masks 66 located in one part of the linear array and the masks 68 located in the other part. Each mask has an aperture of a particular size and shape to adjust the beam and light spot on the film F, and is positioned on alignment pins 70 fixed to the plate 56 so that the aperture overlies an opening 72 or 74 larger than the aperture in the mask. The openings 72 underlie the masks 66 adjacent one end of the aperture plate and are larger than the openings 74 under the masks 68 at the other end in order to expose the larger apertures in the respective masks 66.

Figure 5:
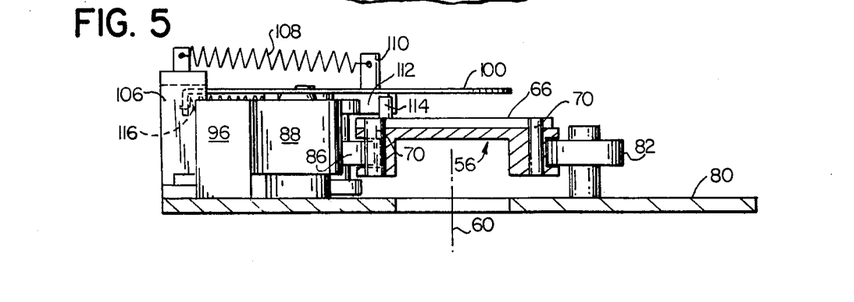
FIG. 5 is a side elevation of the aperture plate as viewed along the line 5—5 in FIG. 3.

The aperture plate 56 is mechanically supported in the plotting head 12 on a mounting base 80 between stationary guides 84 by means of roller bearings 82 as shown most clearly in FIG. 5. The plate 56 has a groove along one side and the roller bearings 82 fit within the groove and prevent the plate from shifting vertically relative to the base 80. Another roller bearing 86 engages a similar groove on the opposite side of the plate 56 from the rollers 82 and is mounted in one end of an arm 88. The arm is pivoted at the opposite end on a pivot pin 90 and is biased toward the plate 56 by means of a compression spring 92 interposed between the arm 88 and a recessed retaining block 96. With the compression spring 92 urging the roller bearing 86 against the aperture plate, the plate is held against and aligned by the roller bearings 82. Thus, the plate is permitted to shift over the mounting base 80 in a linear direction determined by the roller bearings 82.

It will be observed that the mounting pins 70 for the aperture masks 66 and 68 extend through the groove at one side of the aperture plate and engage the roller bearing 86 as shown most clearly in FIGS. 3 and 5. The pins 70 are spaced relative one another so that the bearing 86 rests against two of the pins and serves a detent for locking the plate in a predetermined longitudinal position relative to the base 80. Furthermore, the pins and bearing locate the individual aperture masks 66 and 68 so that the center of each aperture registers with the beam axis when the roller bearing 86 is in a detent position. Accordingly, the aperture plate 56 may be shifted longitudinally in discrete increments relative to itself and the rest of the plotting head 12 so that any one of the apertures in the masks 66 and 68 is positioned in registration with the beam axis 60 to change the beam characteristics in discrete steps. The spring biased roller bearing 86 and pins 70 hold the aperture plate in the correct longitudinal position for any particular aperture mask.

The light beam emanating from the source 50 and passing through the condensing lens 54 falls upon the apertures in the masks and effectively illuminates the apertures. The objective lens 58 which may be a compound lens system projects the image of the illuminated aperture as a focussed image on the light sensitive film F.

In the aperture slide illustrated in FIG. 3, the smaller masks 68 are approximately half the size of the larger masks and are positioned in the linear series at twice the density of the larger masks. Since the light beam falling on the aperture masks after passing through the condensing lens must have a cross section at least as large as the largest aperture in the masks 66, the beam could overlap two of the smaller closely spaced masks 68 unless some means are provided for selectively reducing the beam section at the masks.

The beam reducing means illustrated comprises an attenuation blade 100 pivotally mounted on a pin 102 fixed to the base 80 for movement in and out of the beam. The one end of the blade overlying the aperture plate 56 has an opening 104 corresponding approximately to the size of the openings 74 under the smaller aperture masks 68. The opposite end of the blade projects from the pivot pin 102 into a gap established between a U-shaped bracket 106 which establishes the limits of pivotal blade motion shown in solid line and phantom respectively. An over-center spring 108 is connected between the bracket 106 and an anchor pin 110 attached to the blade on the opposite side of the pivot pin 102 from the bracket and causes the blade to be pulled into one of the limiting positions established by the bracket 106. As illustrated in FIG. 3, the aperture 104 in the blade is in registration with the beam axis 60 and the same end of the blade is sized to obstruct all of that portion of the light beam emanating from the condensing lens 54 that would overlap on the smaller masks 68 adjacent the mask in registration with the beam. Thus, the beam section is attenuated by the blade 100 and prevents more than one of the smaller apertures from being illuminated and creating images on the film F.

The blade 100 is moved in and out of its attenuating position in registration with the beam axis 60 by means of a freely pivoted lever 112 immediately below the blade, a transfer pin 114 fixed in the aperture plate 56 and a retention spring 116. The transfer pin 114 mounted intermediate the two groups of aperture masks 66 and 68 engages the lever 112 whenever the aperture plate 56 is shifted longitudinally of itself to change registration of the beam from the small aperture masks 68 to the adjacent large aperture masks 66 and vice versa.

As the pin 114 contacts the lever 112 and displaces the lever about the pivot pin 102 from its solid line position in FIG. 3, the retention spring 116 carries the blade 100 with the lever and as the blade reaches the over-center position with respect to the pin 102, the spring 108 flips the blade to its phantom position. Further movement of the aperture plate brings the large aperture of the adjacent mask 66 into registration with the beam axis 60. At the same time, or upon subsequent motion of the plate 56 in the same direction, the transfer pin 114 contacts the pivoted lever 112 and rotates the lever slightly in order to slip past the tip of the lever. At this point, the attenuating blade 100 is situated at its limit position illustrated in phantom and, therefore, the lever 112 must rotate relative to the blade by an additional amount which is accommodated by the retention spring 116. As the transfer pin 114 slips by the tip of the lever 112, the retention spring pulls the lever back into its aligned position with the blade 100.

The operation of returning the blade 100 to its attenuating position in registration with the beam is performed by the transfer pin 114 in precisely the same fashion but with the translational and rotational motions occurring in the opposite directions.

In prior art plotters with photo-optical light heads, the aperture plates are shifted so that one aperture or another is placed in registration with the beam axis by means of a motor mounted in the plotting head and an encoder utilized as a feedback sensor for accurately positioning the plate with the motor. In the present invention, both the motor and the encoder are eliminated and, thus, a substantial reduction in the weight of the plotting head is obtained. The motion of the aperture plate is instead produced by translating the plotting head 12 and an engagement means such as an abutment relative to one another while the aperture plate is engaged with the means.

Accordingly, solenoid actuated abutment or stop pins 120 and 122 are mounted at opposite ends of the support beam 40 at locations which permit the pins to intersect and engage the aperture plate 56 when the head is moved to one side of the film of light sensitive material mounted on the plotting drum 14. The abutment pin 120 is supported on the frame 20 of the plotting machine 10 at one end of the beam 40 for extension and retraction by means of the solenoid 124, and the pin 122 is similarly mounted at the opposite end of the beam by means of the solenoid 126. Operation of the plotting head 12, the pin 120 and solenoid 124 is described below for shifting the aperture plate 56 in one direction or sense relative to the head. Operation of the head 12, the pin 122 and solenoid 126 is basically the same for shifting the aperture plate in the opposite direction or sense.

Shifting of the aperture plate 56 relative to the plotting head in one direction is illustrated and described most clearly in connection with FIG. 2. The pin 120 is extended upwardly by the solenoid 124 which places the pin in intersecting or interfering relationship with and stops the plate 56 when the plotting head 12 is moved toward its limit of travel at the adjacent side of the film F and plotting drum 14. Continued motion of the plotting head after the plate 56 has contacted the abutment pin 120 forces the plate 56 to be shifted relative to the head and moves a new aperture mask 66 or 68 (FIG. 3) into registration with the beam of light emanating from the source 50. The precise mask brought into registration with the beam is determined by the position to which the plotting head 12 is moved relative to the abutment pin 120, and this position is controlled by the control computer 16 through the drive motor 42. When the drive motor 42 has positioned the head approximately in the correct relationship with the abutment pin 120, and the aperture 56 has shifted into approximately the correct position for the aperture mask to register with the light beam, the detent bearing 86 in FIGS. 3 and 5 locks the plate in the precise position which registers the aperture with the beam axis 60. Of course, positioning of the attenuating blade 100 in or out of alignment with the aperture masks is controlled by shifting the aperture plate 56 within the head 12 as described above.

To change the position of the aperture plate by means of the abutment pin 120, the pin is extended by the solenoid 124 into intersecting relationship with the plate as illustrated in FIG. 2. Normally, the pin remains retracted within the solenoid 124 and out of intersecting relationship with the plate so that during plotting, the head 12 can translate to its limit of travel and bring the light beam from the head to the extreme edge of the plotting drum 14 with the aperture plate projecting substantially beyond the position of the abutment pin 120 as shown in phantom. Thus, the solenoid 124 allows the plotting head 12 to operate on the film F of plotting material at the extreme limit of travel of the head while the plate, with any desired aperture mask in registration with the beam axis, projects substantially beyond the pin. When it is desired to shift the aperture plate, the solenoid 124, also controlled by the computer 16, is extended and the head 12 moves into a predetermined positional relationship relative to the pin at or near the limit of travel to shift the plate by a controlled amount.

Of course, the abutment pin 120 could be fixedly mounted on the frame 20 of the plotter without a solenoid provided that there is no need to plot close to the edge of the film F or provided that the film does not extend to a point which requires the head to move to its limit of travel in order to reach the side of the film.

In a plotting operation, the head 12 and the drum 14 are moved relative to one another in controlled relationship determined by the computer 16, and the spot of light developed by the light beam projected from the head onto the light sensitive film F exposes the film in a predetermined pattern corresponding to the graphic information to be plotted. While plotting, the abutment pins 120 and 122 are retracted so that information can be generated near the edges of the film F. When it becomes desirable or necessary to change the aperture mask in registration with the light beam, either the light source 50 is deactivated or a shutter mechanism in the head closes and cuts off the beam before it reaches the film. The plotting head 12 is then traversed to one end of the support rail 40 and the abutment pin 120 or 122 at that end of the rail is extended to engage the projecting end of the aperture plate 56 and to shift the plate relative to the head by an amount determined by the computer 16. Thus, a new aperture mask is brought into registration with the light beam and the head then returns to its plotting position or some other plotting position where the light beam is again activated to resume exposure of the film F.

In summary, an apparatus and method have been disclosed for changing the operating characteristics of a precisely controlled tool head by means of the drive mechanisms that are normally used to position the head and a workpiece relative to one another. In the plotting head 12 the aperture plate 56 is moved relative to the head to change the spot of light produced on the light sensitive film F, and the need for a separate drive motor and feedback mechanism as shown in the prior art is totally eliminated. In effect, the drive mechanism for the plotting head becomes a dual function mechanism and eliminates extra weight carried around in the plotting head so that improved response and performance is achieved.

While the present invention has been described in a preferred embodiment, it will be understood that numerous modifications or substitutions can be had without departing from the spirit of the invention. For example, the invention can be employed to change the operating characteristics of other types of tool heads. Although the invention is disclosed in a round bed plotter, it will readily be apparent to those skilled in the art that the invention can be used with equal facility on a flat bed plotter or other machines wherein the tool head or the sheet material is moved in two coordinate directions relative to the machine frame as shown, for example, in U.S. Pat. No. 3,330,182, referenced above. In such instance, the members which engage the adjustable aperture plate or other member on the plotting head are preferably mounted on a carriage which moves the head in just one of the coordinate directions, or the engaging members extend in the one of the coordinate directions to engage the head at any station along the coordinate. While the aperture plate is moved linearly to change the operating characteristics of the head, it will be understood that the adjustable member can rotate or move in any other manner to adjust the head by means of rack gears and other motion converting mechanisms. Also, the adjustment of one or more operating characteristics can be derived from motions of the plotting head and workpiece in several different coordinate directions. Accordingly, the present invention has been described in a preferred embodiment by way of illustration rather than limitation.

We claim:

1. In a plotting apparatus having a plotting head which contains an adjustable instrument for generating graphic images on a sheet of plotting material and including reversible drive means for translating the plotting head and material back and forth relative to one another whereby graphic images can be produced at different locations on the sheet material, the improvement comprising:
control means mounted on the plotting head and having a member movable in one and an opposite sense relative to the head to reversibly adjust the instrument generating the graphic images on the plotting material; and
actuating means mounted in the plotting apparatus and separated from the plotting head to selectively engage the movable member of the adjustable instrument, the actuating means when engaged with the movable member being cooperative with the reversible drive means to produce relative movement of the member and the head in said one and an opposite sense for reversible instrument adjustment with translation of the actuating means and plotting head relative to one another by the drive means.

2. In a plotting apparatus as defined in claim 1, the improvement wherein: the apparatus includes a structural support for the sheet of plotting material; the plotting head is mounted on the support for movement relative thereto; and the actuating means is mounted in stationary relationship on the support and is selectively engageable with the movable member of the plotting head whereby relative movement of the plotting head and support adjusts the instrument when the movable member and actuating means are engaged.

3. In a plotting apparatus as defined in claim 1, the improvement wherein: the plotting head is mounted for movement in the plotting apparatus relative to the sheet material and the actuating means; and the actuating means comprises an abutment member engageable with the movable member of the instrument at a predetermined plotting position.

4. The improvement of claim 3 wherein the plotting head is movable in the apparatus back and forth between predetermined limits of travel, and the abutment of the actuating means is mounted to engage the movable member of the adjustable instrument at one of the limits of travel.

5. The improvement of claim 4 wherein the abutment of the actuating means is selectively movable at the limit of travel between an operative and an inoperative position.

6. In a plotting apparatus having a light head which projects a beam of light along a beam axis onto a light sensitive film held on a film support and including reversible drive means for translating the light head and film support relative to one another in at least one coordinate direction to move a light spot produced by the beam to various locations on the film and expose the film in a predetermined manner, the improvement comprising:
    beam control means mounted in the light head and having a member movable relative to the head for varying the light spot produced by the beam at various locations on the light sensitive film, the movable member comprising a slide movable relative to the head in a direction parallel to said one coordinate direction; and
    engagement means positioned to engage the movable member of the beam control means in the light head and restrain the member independently of the remaining portions of the head when the head and film support are translated relative to one another at given locations to thereby move said member relative to the head and vary the light spot.

7. In a plotting apparatus the improvement of claim 6 wherein the movable member in the beam control means has discretely different positions in the head corresponding to discrete variations of the light spot produced by the beam on the film.

8. In a plotting apparatus, the improvement of claim 7 further including locking means mounted on the light head and engaging the movable member for locking the member at the discrete positions.

9. In a plotting apparatus, the improvement of claim 6 wherein:
    the drive means translates the light head and film support relative to one another between opposite limits of travel in the one coordinate direction; and
    the engagement means include abutments intercepting the movable slide and situated at the opposite limits of travel in the one coordinate direction.

10. In a plotting apparatus, the improvement of claim 6 wherein the engagement means comprises a selectively positionable abutment movable between a first position intercepting the slide as the head and film support move relative to one another at a given location in the one coordinate direction, and a second position in non-intercepting relationship with the slide.

11. In a plotting apparatus, the improvement of claim 6 wherein the moveable member of the beam control means comprises an adjustable plate having a plurality of discrete apertures and mounted on the light head for moving each of the apertures individually into alignment with the beam axis to thereby conform the beam size and shape to the respective apertures.

12. In a plotting apparatus as defined in claim 11 the improvement further including detent means mounted on the light head and engageable with the adjustable plate for holding the plate in discrete positions aligning the apertures respectively with the beam axis.

13. A plotting apparatus having an optical light head and a support bed for a sheet of light sensitive material movable relative to one another to move over the material a spot of light produced by a light beam generated in the light head and directed onto the light sensitive material comprising:
    reversible drive means connected between the light head and the support bed for producing relative movement between the head and bed;
    reversible control means mounted on the light head for selectively varying the spot of light produced by the beam on the material in one and an opposite sense; and
    actuating means selectively responsive to a predetermined relative movement of the light head and support bed produced by the reversible drive means in one direction for adjusting the control means and varying the spot of light on the material in one sense and also responsive to a predetermined relative movement of the light head and bed produced by the reversible drive means in the opposite direction for adjusting the control means and varying the spot of light in the opposite sense.

14. A plotting apparatus as defined in claim 13 wherein the drive means moves the light head relative to the support bed between opposite sides of the bed; and the actuating means is selectively responsive to predetermined movement of the head at one side of the bed to adjust the reversible control means in the one sense.

15. A plotting apparatus as defined in claim 13 wherein:
    the reversible control means includes a variably positionable member movable relative to the head in one and an opposite sense to adjust the spot of light on the light sensitive material; and
    the actuating means comprises an abutment mounted adjacent the one side of the bed and engageable with the variably positionable member for moving the member in one sense of the control means.

16. A plotting apparatus as defined in claim 15 wherein:
    the control means includes a plurality of discrete apertures positionable in the light beam to change the spot of light on the light sensitive material; and
    the variably positionable member of the control means is connected with the apertures to move the apertures individually into the light beam.

17. A plotting apparatus as defined in claim 16 wherein the apertures are mounted in a sequential array with smaller apertures closely spaced in one part of the array and larger apertures in the other part of the array; the variably positionable member is connected with the apertures to shift the apertures individually into the light beam in the order of the sequential array; and beam reducing means are provided on the carriage and are responsive to the positioning of the smaller apertures by the variably positionable member to reduce the light beam section falling on the closely spaced smaller apertures.

18. A plotting apparatus as defined in claim 13 wherein:
the reversible control means has an adjustable member for varying the spot of light; and
the actuating means includes means for selectively engaging and moving the adjustable member by a desired amount in one and an opposite sense as the light head and support bed move relative to one another through the reversible drive means by a corresponding amount and in a corresponding sense.

19. A plotting apparatus as defined in claim 18 wherein the actuating means comprises an abutment engageable with the adjustable member when the light head is adjacent one side of the support bed.

20. A method of plotting information on light sensitive sheet material with an optical head producing a beam of light comprising:
placing a light sensitive sheet material on a support;
directing the beam of light from the optical head along a beam axis in the head and onto the light sensitive sheet material on the support;
moving the optical head and the support with the light sensitive sheet material back and forth in one and an opposite direction relative to one another to shift the light beam over the sheet material and expose the material at various locations;
providing in the optical head a beam control including a member movable in one and an opposite sense relative to the head for changing a beam parameter in one and an opposite manner respectively;
providing engaging means separated from the optical head and connected with the support for selectively engaging the movable member of the beam control;
selectively engaging the movable member with the engaging means and then moving the head and the support with the engaging means relative to one another in said one direction by a selected amount to move the engaged member relative to the head means in said one sense by a corresponding amount and thereby change the beam parameter in said one manner; and
selectively engaging the movable member with the engaging means and then moving the head and the support with the engaging means relative to one another in said one direction by a selected amount to move the engaged member relative to the head means in said one sense by a corresponding amount and thereby change the beam parameter in said one manner; and
selectively engaging the movable member with the engaging means and then moving the head and the support with the engaging means relative to one another in said opposite direction by a selected amount to move the engaged member relative to the head in said opposite sense by a corresponding amount and thereby change the beam parameter in said opposite manner.

21. A method of plotting with an optical head as defined in claim 20 wherein:
the step of providing a beam control comprises providing a plate movable in the head and having a series of optical control members movable with the plate into individual registration with the beam axis to change a beam parameter; and
the respective steps of selectively engaging and then moving comprise engaging the plate and moving the head relative to the engaged plate to place one of the series of optical control members in registration with the beam axis.

22. A method of plotting as defined in claim 21 wherein the plate of optical control members includes a series of apertures.

23. A method of plotting as defined in claim 21 wherein the apertures have different sizes and shapes.

24. A method of plotting as defined in claim 21 wherein the plate has the optical control members arranged in a straight linear series.

25. A method of plotting information with a light head as defined in claim 20 wherein:
the step of providing an engaging means comprises providing an abutment on the support at one side of the light sensitive sheet material.

26. A method of plotting as defined in claim 25 wherein one of the steps of selectively engaging the movable member and then moving includes moving the optical head and the support relative to one another in a preselected one of said directions until the movable member of the beam control and the abutment are in engagement, and then moving the member relative to the head by continuing relative movement of the head and support in the preselected direction.

27. The method of claim 26 wherein the step of selectively engaging comprises holding the abutment in stationary relationship with the sheet material on the support and moving the optical head and the support relative to one another until the abutment and the movable member are in engagement.

28. A method of controlling a plotting machine having an adjustable plotting head mounted in the machine for movement relative to a sheet of plotting material comprising:
supporting a sheet of plotting material in a generally fixed position on one part of the machine;
moving the plotting head and the one part of the machine supporting the plotting material relative to one another in one and an opposite sense along one coordinate direction while the head is activated to generate a plot on the sheet material;
providing the plotting head with an adjustable member movable with the head while the head is generating a plot on the sheet material and movable in one and an opposite sense relative to the head for reversible adjustment of the plotting head;
engaging the movable adjustment member on the head with the part of the machine supporting the sheet of plotting material, and moving the head and the part of the machine supporting the material relative to one another in one sense along the one coordinate direction while the adjustment member is engaged with the supporting part of the machine to produce relative movement of the adjustment member and head in one sense and thereby cause the head to be adjusted in the one sense; then
disengaging the adjustment member from the supporting part of the machine and continuing the relative movement of the head and plotting material while the plotting head is activated to generate the plot in the adjusted condition;
subsequently engaging the movable adjustment member on the head with the supporting part of the machine, and moving the head and the supporting part of the machine relative to one another in the opposite sense along the one coordinate direction to produce relative movement of the adjustment member and the head in the opposite sense and thereby cause the head to be readjusted in the opposite sense; then again disengaging the adjustment member from the supporting part of the machine and continuing the relative movement of the head and the plotting material while the head is activated to generate the plot in the readjusted condition.

29. A method of controlling a plotting machine as defined in claim 28 wherein the step of moving the plotting head and supporting part during engagement of the adjustment member comprises moving the head and supporting part relative to one another by predetermined amounts to correspondingly provide a predetermined adjustment of the head.

30. A method of controlling a plotting machine as defined in claim 28 further including the step of deactivating the plotting head during the steps of engaging.

31. A method of controlling a plotting machine as defined in claim 28 wherein the step of engaging the movable member comprises moving the plotting head relative to the supporting part until the movable member and the supporting part are in abutment.

* * * * *

UNITED STATES PATENT AND TRADEMARK OFFICE
CERTIFICATE OF CORRECTION

PATENT NO. : 4,209,239
DATED : June 24, 1980
INVENTOR(S) : Kenneth O. Wood, Robert S. Alford It is certified that error appears in the above-identified patent and that said Letters Patent are hereby corrected as shown below:

Column 11, line 41, delete "means".

Column 11, lines 44-51, please delete.

Signed and Sealed this

Twenty-first Day of October 1980

[SEAL]

Attest:

SIDNEY A. DIAMOND

Attesting Officer

Commissioner of Patents and Trademarks